US007590482B2

(12) United States Patent
Watanabe

(10) Patent No.: US 7,590,482 B2
(45) Date of Patent: Sep. 15, 2009

(54) FUEL INJECTION CONTROLLER

(75) Inventor: Shingo Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 154 days.

(21) Appl. No.: 11/887,829

(22) PCT Filed: Apr. 5, 2006

(86) PCT No.: PCT/JP2006/307252

§ 371 (c)(1),
(2), (4) Date: Oct. 4, 2007

(87) PCT Pub. No.: WO2006/109656

PCT Pub. Date: Oct. 19, 2006

(65) Prior Publication Data

US 2009/0070004 A1 Mar. 12, 2009

(30) Foreign Application Priority Data

Apr. 6, 2005 (JP) ............................. 2005-110346

(51) Int. Cl.
*B60T 7/12* (2006.01)
*F02M 1/00* (2006.01)

(52) U.S. Cl. ........................ 701/103; 123/456; 123/457

(58) Field of Classification Search ................. 701/103, 701/104, 114, 115; 123/447, 448, 456, 457, 123/463
See application file for complete search history.

(56) References Cited

U.S. PATENT DOCUMENTS 6,353,791 B1 * 3/2002 Tuken et al. ................ 701/114
6,694,945 B2 * 2/2004 Kawaguchi et al. ......... 123/299

(Continued)

FOREIGN PATENT DOCUMENTS

JP 10-176592 A 6/1998

(Continued)

OTHER PUBLICATIONS

International Search Report mailed Jun. 13, 2006.

(Continued)

*Primary Examiner*—John T Kwon
(74) *Attorney, Agent, or Firm*—Nixon & Vanderhye, PC

(57) ABSTRACT

A fuel injection controller used for a fuel injection device that pumps high-pressure fuel to an accumulator and distributes the high-pressure fuel accumulated in the accumulator to injectors mounted in respective cylinders of an internal combustion engine calculates an input quantity and an output quantity of the fuel to and from the accumulator and monitors fuel pressure in the accumulator with a pressure sensor attached to the accumulator. The fuel injection controller has a determination device that determines whether there is a deviation between a sensing value Pcob1 of the pressure sensor and a corresponding value assumed from data Qpf applied to balance computation of the fuel input/output quantities and a storage part that stores the corresponding value Pcf2 based on the data Qpf applied to the balance computation and the sensing value Pcob1 of the pressure sensor and that enables subsequent reading out of the stored values. Thus, it can be determined whether the control is normal control or abnormal control based on the sensing signal of the fuel pressure sensor even if the characteristic deviation of the fuel pressure sensor arises due to incorrect wiring or the like.

5 Claims, 4 Drawing Sheets

U.S. PATENT DOCUMENTS

| | | | | |
|---|---|---|---|---|
| 2008/0017173 | A1* | 1/2008 | Fujii | 123/478 |
| 2008/0103675 | A1* | 5/2008 | Ishizuka et al. | 701/103 |
| 2009/0063010 | A1* | 3/2009 | Nakata et al. | 701/103 |
| 2009/0063016 | A1* | 3/2009 | Nakata et al. | 701/103 |
| 2009/0063022 | A1* | 3/2009 | Ishizuka et al. | 701/106 |

FOREIGN PATENT DOCUMENTS

| | | | |
|---|---|---|---|
| JP | 2001-082230 | | 3/2001 |
| JP | 2002-47983 | A | 2/2002 |
| JP | 2002-130023 | A | 5/2002 |
| JP | 2003-41998 | A | 2/2003 |
| JP | 2003-222045 | | 8/2003 |
| JP | 2003-293835 | A | 10/2003 |

OTHER PUBLICATIONS

International Preliminary Examination Report dated Aug. 1, 2007 (Text in Japanese - English Translation Provided).

* cited by examiner

FUEL INJECTION CONTROLLER

This application is the U.S. national phase of International Application No. PCT/JP2006/307252 filed 5 Apr. 2006 which designated the U.S. and claims priority to JP 2005-110346 filed 6 Apr. 2005, the entire contents of each of which are hereby incorporated by reference.

TECHNICAL FIELD

The present invention relates to a fuel injection controller and in particular to a pressure accumulation fuel injection controller that accumulates high-pressure fuel, which is pumped by a fuel supply pump, in a common rail and performs injection supply of the high-pressure fuel accumulated in the common rail into respective cylinders of an internal combustion engine through injectors.

BACKGROUND TECHNOLOGY

A known accumulator fuel injection device pressurizes and pumps high-pressure fuel to a common rail with the use of a fuel supply pump rotated by an engine such as a multi-cylinder diesel engine. The fuel injection device accumulates the high-pressure fuel in the common rail. The fuel injection device distributes the high-pressure fuel, which is accumulated in the common rail, to injectors mounted in respective cylinders of the engine and carries out injection supply of the high-pressure fuel into the combustion chambers of the respective cylinders (for example, as described in JP-A-2001-82230). A fuel injection controller senses fuel pressure in the common rail as actual common rail pressure with a fuel pressure sensor. The fuel injection controller performs feedback control of a fuel discharge quantity of a fuel supply pump to substantially conform the actual common rail pressure to target common rail pressure set based on an operation state of the engine. The fuel injection controller calculates injection pulse width based on a target injection quantity set based on the actual common rail pressure and the operation state of the engine. The fuel injection controller carries out injection quantity control for controlling energization of an injection drive signal of the injector in accordance with the injection pulse width.

However, with the conventional technology, when a characteristic deviation is caused in a sensing signal sensed with the fuel pressure sensor, e.g., because of incorrect wiring of a sensor harness, there is a possibility that the control is performed based on a value shifted from the target common rail pressure. For example, when the actual common rail pressure sensed by the fuel pressure sensor shows a characteristic value shifted to the low pressure side from the actual pressure, the operation is performed at higher pressure than the target common rail pressure. As a result, there is a possibility that the injection quantity injected and supplied from the injector to the engine increases. When the increase in the injection quantity due to the characteristic deviation of the fuel pressure sensor is large, there is a possibility that the aimed engine operation state cannot be maintained.

The present invention has been made by taking such the situation into account and has an object to provide a fuel injection controller capable of determining whether control is normal control or abnormal control based on a sensing signal of a fuel pressure sensor even if a characteristic deviation of the fuel pressure sensor arises due to incorrect wiring or the like.

DISCLOSURE OF INVENTION

The present invention provides following technical devices in order to attain the above-described object. According to the invention described in claims 1 to 5, a fuel injection controller used for a fuel injection device that pumps high-pressure fuel to an accumulator (2) with a fuel supply pump (4) and that distributes the high-pressure fuel accumulated in the accumulator (2) to injectors (3) mounted to respective cylinders of an internal combustion engine (1) calculates an input quantity and an output quantity of the fuel to and from the accumulator (2) and monitors fuel pressure in the accumulator (2) with a pressure sensor (35) attached to the accumulator (2). The fuel injection controller is characterized by including a determination device that determines whether there is a deviation (ΔPcf) between the sensing value (Pcob1) of the pressure sensor (35) and a corresponding value assumed from the data applied to the balance computation of the fuel input/output quantities and a storage part that stores a corresponding value (Pcf2) based on the data (Qpf, Qp2) applied to the balance computation and the sensing value (Pcob1) of the pressure sensor (35) and that enables subsequent reading out of these values.

According to the invention described in claims 1 to 5, even when the characteristic deviation arises in the sensing signal of the pressure sensor (35) because of the incorrect wiring of the sensor harness or the like, the determination device can determine whether there is an abnormal deviation equal to or greater than the predetermined value (ΔPcf) between the sensing value (Pcob1) of the pressure sensor (35) and the corresponding value assumed from the data applied to the balance computation of the fuel input/output quantities.

Moreover, the storage part that stores the corresponding value (Pcf2) based on the data (Qpf, Qp2) applied to the balance computation and the sensing value (Pcob1) of the pressure sensor (35) deviated from the corresponding value and that enables subsequent reading out of these values is provided. Accordingly, it is possible to at least determine whether the cause of the abnormal deviation is fuel leak from a high pressure fuel passage or the other factor.

Therefore, it can be determined whether the control is the normal control or the abnormal control based on the sensing signal of the pressure sensor (35) even if the characteristic deviation of the pressure sensor (35) arises due to the incorrect wiring or the like.

According to the invention described in claim 2, the determination device determines whether the deviation between the sensing value (Pccb1) of the pressure sensor (35) and the corresponding value assumed from the data is an abnormal deviation equal to or greater than a predetermined quantity (ΔQ) based on the data (Qp2, Qp1) applied to the balance computation. The determination device stores the corresponding value (Pcf) and the data (Qp2), from which the corresponding value is assumed, in the storage part if an affirmative result is provided by the determination.

According to the invention described in claim 2, the method of determining whether the deviation between the sensing value (Pccb1) of the pressure sensor (35) and the corresponding value assumed from the data is the abnormal deviation determines whether the deviation is the abnormal deviation equal to or greater than the predetermined quantity (ΔQ) based on the data (Qp2, Qp1) applied to the balance computation. Accordingly, it can be determined whether the control is the normal control or the abnormal control based on the sensing signal of the pressure sensor (35) without making the structure complicated, e.g., by providing another pressure sensor to the accumulator (2) to check the pressure sensor (35).

According to the invention described in claim 3, a common rail pressure control device that controls the fuel pressure in the accumulator (2) to target fuel pressure (Pca) based on the sensing value (Pcob1) of the pressure sensor (35) is provided. The deviation of the corresponding value based on the data applied to the balance computation is a deviation amount (ΔQpi) between a prospective value (Qpa, Qp1) based on the balance computation value of the fuel input/output quantities and a control value (Qpf, Qp2) controlled to the target fuel pressure (Pca) based on the balance computation value of the fuel input/output quantities.

According to the invention described in claim 3, the definition can be made with the deviation amount (ΔQpi) between the prospective value (Qpa, Qp1) and the control value (Qpf, Qp2) by using the control value (Qp) for controlling the fuel pressure in the accumulator (2) to the target fuel pressure. Accordingly, it can be quickly determined whether the control is the normal control or the abnormal control based on the sensing signal of the pressure sensor (35). Thus, the abnormal condition can be promptly announced to occupants of the vehicle having the internal combustion engine to urge the repair for retuning to the normal state, for example.

According to the invention described in claim 4, the storage part stores the data of the deviation (ΔQpi) when the deviation between the control value (Qpf, Qp2) and the prospective value (Qpa, Qp1) is equal to or greater than a predetermined value (ΔQp).

According to the invention described in claim 4, for example, in the case where a repair request for returning to the normal state is made at a repair shop or the like by a vehicle user such as the occupant, it can be easily determined whether the cause is the fuel leak or the characteristic deviation of the pressure sensor due to the incorrect wiring of the sensor harness and the like based on the deviation (ΔQpi) read from the storage part.

The numerals in the brackets applied to the above-described devices are examples showing relationships with concrete devices described in an embodiment mentioned later.

BEST MODE FOR CARRYING OUT THE INVENTION

Figure 1:
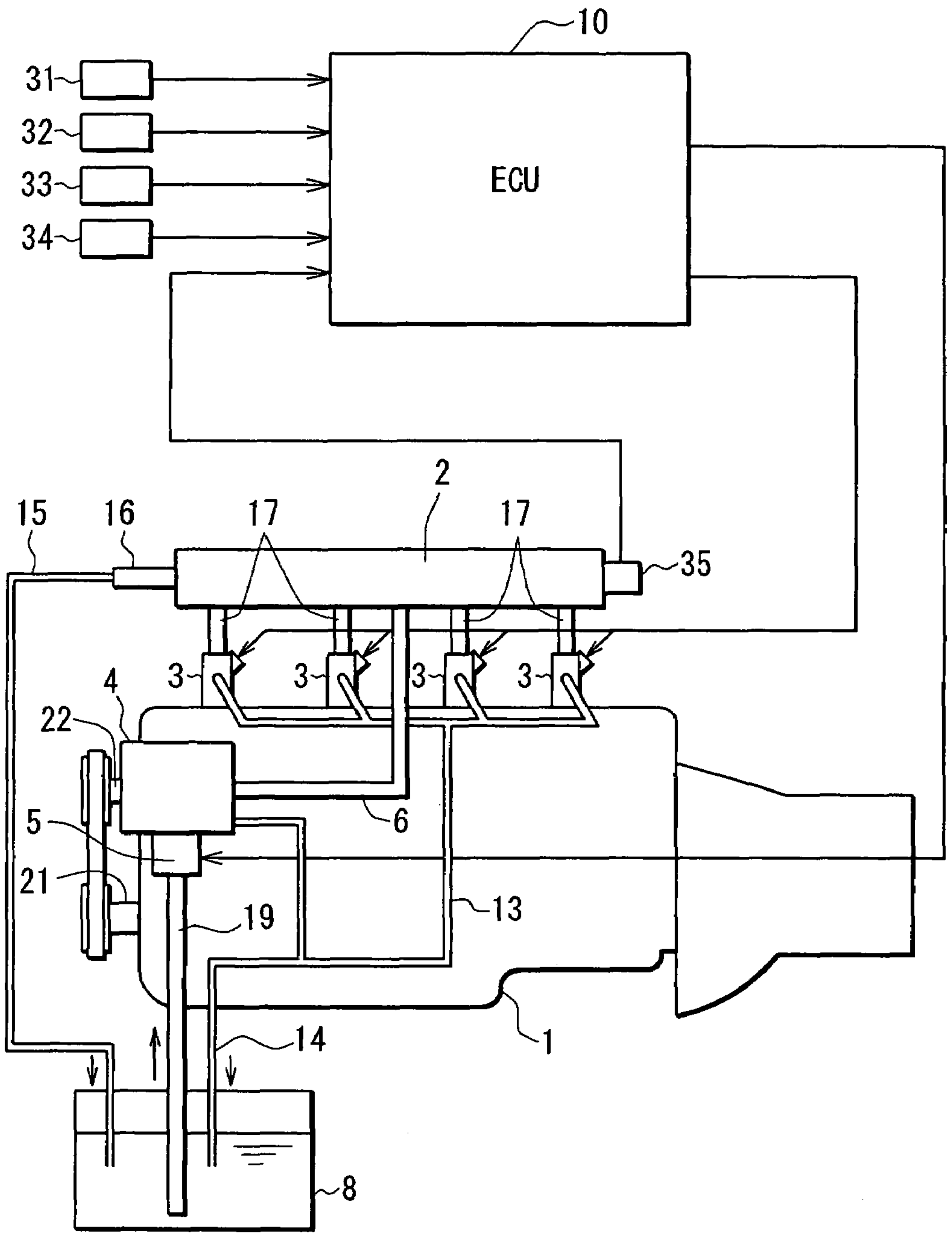
FIG. 1 is a schematic diagram showing a fuel injection controller according to an embodiment of the present invention.
Figure 2:
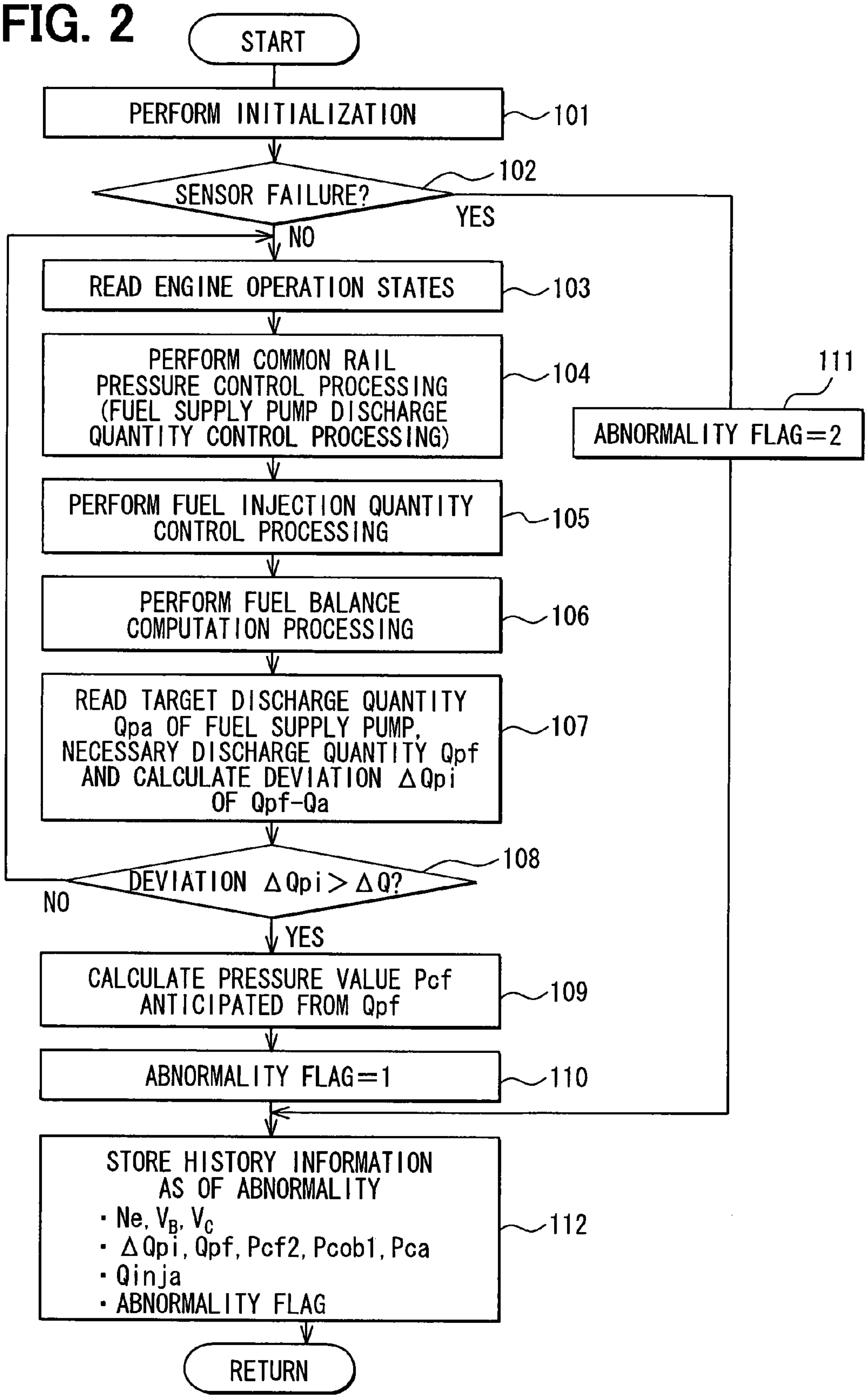
FIG. 2 is a flowchart showing a control method of monitoring whether control is normal control or abnormal control based on a sensing signal of a pressure sensor performed by an ECU of FIG. 1.
Figure 3:
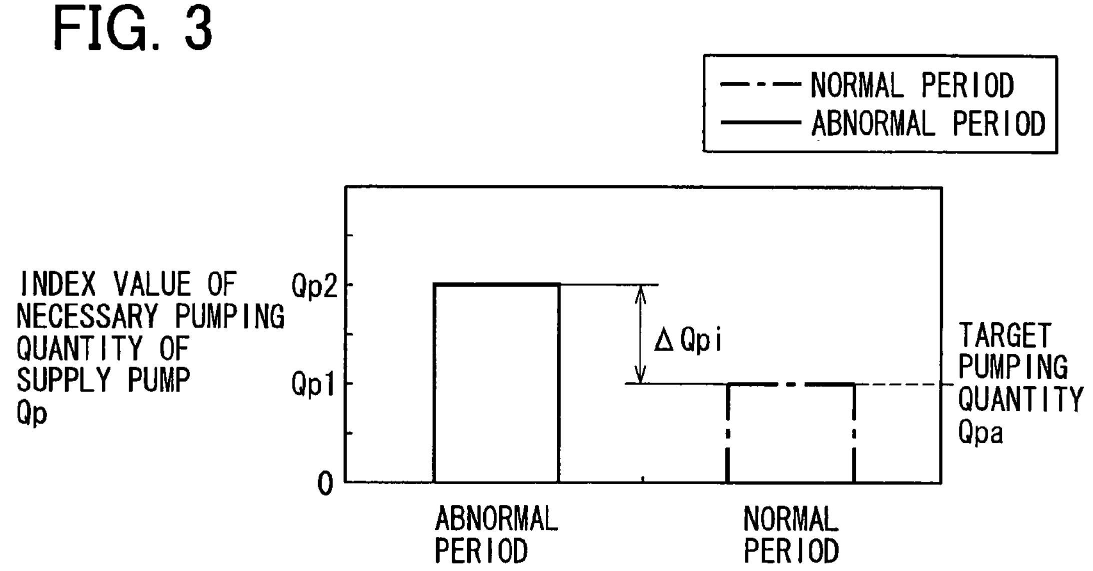
FIG. 3 is a graph explaining a deviation between a target discharge quantity as a prospective value and a necessary discharge quantity as a control value in the control method of FIG. 2.
Figure 4:
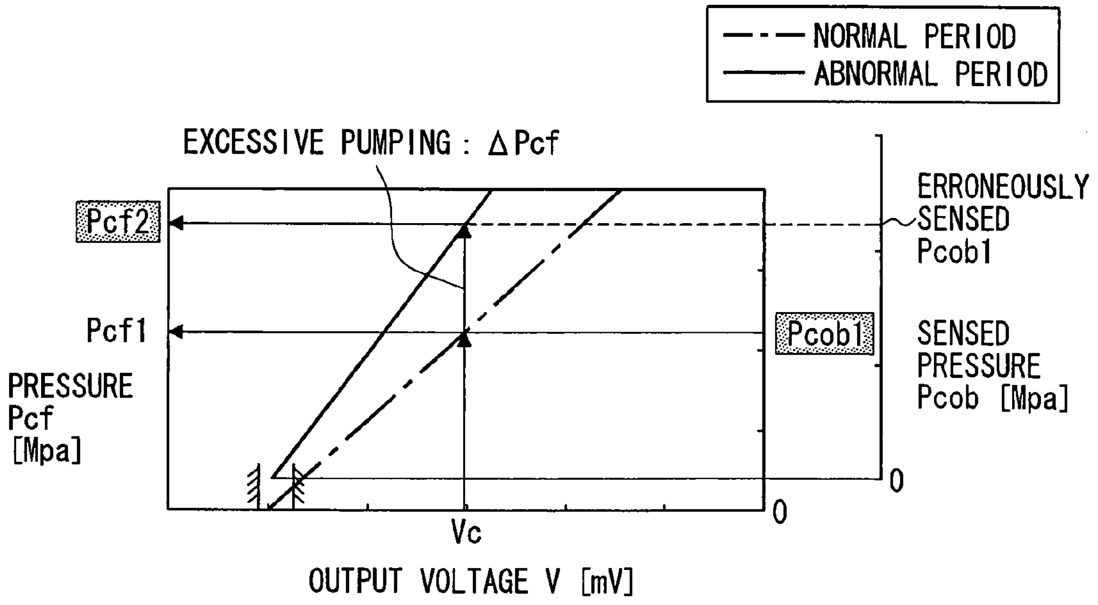
FIG. 4 is a graph showing a relationship between an output value of the pressure sensor in FIG. 1 and a sensed pressure value.

Hereafter, an embodiment of a fuel injection controller of the present invention applied to a pressure accumulation fuel injection controller will be explained with reference to drawings. FIG. 1 is a schematic diagram showing a fuel injection controller according to an embodiment of the present invention. FIG. 2 is a flowchart showing a control method of monitoring whether control is normal control or abnormal control based on a sensing signal of a pressure sensor performed by an ECU of FIG. 1. FIG. 3 is a graph explaining a deviation between a target discharge quantity as a prospective value and a necessary discharge quantity as a control value in the control method of FIG. 2. FIG. 4 is a graph showing a relationship between an output value of the pressure sensor in FIG. 1 and a sensed pressure value. FIG. 3 shows an example of the abnormal control based on the sensing signal of the fuel pressure sensor and shows a relationship between a prospective value assuming a normal period and a control value in an abnormal period due to the abnormal control.

An accumulation fuel injection device (hereinafter, referred to as common rail type fuel injection device) is a fuel injection system that performs injection supply of fuel to a diesel engine 1 (hereinafter, referred to as engine), for example. The common rail type fuel injection device, as shown in FIG. 1, has a common rail 2 as an accumulator for storing high-pressure fuel, an injector 3 for performing fuel injection and for stopping the injection, a supply pump 4 as a fuel supply pump for pumping the fuel at high pressure and a controller 10 (hereafter referred to as ECU) as a control device for controlling these.

The engine 1 has multiple cylinders, each of which performs an intake stroke, a compression stroke, an expansion stroke and an exhaust stroke as a combustion cycle continuously. Although FIG. 1 shows a four-cylinder engine as an example, an engine with the other number of cylinders may be used.

The common rail 2 is an accumulator that accumulates the high pressure fuel to be supplied to the injector 3. The common rail 2 is connected to a discharge port of the supply pump 4, which pumps the high pressure fuel, through a fuel pipe 6 as a high pressure fuel passage so that common rail pressure equivalent to fuel-injection pressure is accumulated. Part of the high pressure fuel supplied to the injector 3 such as surplus fuel is discharged from the injector 3 as leak fuel. The leak fuel from the injector 3 is returned to a fuel tank 8 through a relief pipe 13 as a fuel return passage.

A pressure limiter 16 is attached to the relief pipe 15 leading from the common rail 2 to the fuel tank 8. The pressure limiter 16 is a pressure safety valve and is structured to open when the fuel pressure in the common rail 2 exceeds limit set pressure to hold down the fuel pressure in the common rail 2 to or below the limit set pressure.

The injector 3 is mounted to each cylinder of the engine 1 and performs injection supply of the fuel into the cylinder. The injector 3 is connected to a downstream end of each one of multiple high pressure fuel pipes 17 branching from the common rail 2 and performs the injection supply of the high pressure fuel accumulated in the common rail 2 to each cylinder. The injector 3 is an electromagnetic valve injector that performs the fuel injection and suspends the fuel injection by performing drive control of an electromagnetic valve (not shown). The injector 3 is a fuel injection valve of a known structure having an injection hole (not shown) for injecting the fuel, a needle (not shown) as a valve member for blocking and allowing the fuel injection from the injection hole, a control pressure chamber (not shown) for lifting the needle with the fuel pressure, and the electromagnetic valve that increases and decreases the fuel pressure in the control pressure chamber.

The supply pump 4 is a pump that pumps the high pressure fuel to the common rail 2. In detail, the supply pump 4 has a feed pump (not shown) for suctioning the fuel in the fuel tank 8 to the supply pump 4 and a high-pressure pump (not shown) for compressing the fuel suctioned by the feed pump to the high pressure and for pumping the fuel to the common rail 2. The feed pump and the high-pressure pump are driven by a common camshaft 22. The camshaft 22 is driven and rotated by a crankshaft 22 of the engine 1 and the like.

The supply pump 4 has a metering control valve 5 that adjusts the quantity of the fuel suctioned by the high-pressure pump, i.e., the discharge quantity pumped to the common rail 2. Through the drive control of the metering control valve 5 performed by the ECU 10, the common rail pressure is adjusted.

The ECU 10 has a microcomputer of a known structure with functions of a CPU that performs control processing and computation processing, a storage device that stores various programs and data (memory such as ROM, standby RAM, EEPROM or RAM), an input circuit, an output circuit, a power source circuit, a drive circuit for the electromagnetic valve of the injector 3 (referred to as injector drive circuit hereinafter), a drive circuit of the metering control valve 5 of the supply pump 4 (referred to as pump drive circuit hereinafter) and the like. The ECU 10 performs various computation processing based on the signals inputted from the sensors to the ECU 10.

The ECU 10 is connected with an accelerator sensor 31 for sensing an accelerator position Accp, a rotation speed sensor 32 for sensing engine rotation speed Ne, a coolant temperature sensor 33 for sensing temperature Tw of an engine coolant, a fuel temperature sensor 34 for sensing temperature Tf of the fuel suctioned into the supply pump 4, a fuel pressure sensor 35 (referred to as common rail pressure sensor hereinafter) for sensing the common rail pressure Pc and other sensors.

The ECU 10 has an injection device for controlling the injection operation of the injector 3, a common rail pressure control device for controlling the common rail pressure in the common rail 2 to target fuel pressure (target common rail pressure), and a pressure condition monitoring device for monitoring the pressure state of the high-pressure fuel passage such as the common rail 2. The target common rail pressure is equivalent to the fuel-injection pressure of the fuel injected from the injector 3 and is set at the optimal fuel pressure according to the operation state of the engine 1.

The injection device consists of a target injection quantity decision device, an injection timing decision device, an injection period decision device, and an injector drive device. The target injection quantity decision device decides the optimal target injection quantity Qfin according to the operation state of the engine 1 sensed by the various sensors. The injection timing decision device decides command injection timing Tfin (energization pulse timing) based on the target injection quantity Qfin and the engine rotation speed Ne. The injection period decision device decides a command injection period Tinj (energization pulse period) based on the common rail pressure Pc and the target injection quantity Qfin. The injector drive device applies energization current substantially in the shape of a pulse to the electromagnetic valve of the injector 3 of each cylinder from the command injection timing (Tfin) until the injection command pulse period Tinj elapses.

The common rail pressure control device has a discharge quantity control device for controlling the discharge quantity of the supply pump 4 to the common rail 2. The common rail pressure control device senses the actual fuel pressure (referred to as actual common rail pressure, hereinafter) in the common rail 2 with the common rail pressure sensor 35 and performs feedback control to substantially conform the actual common rail pressure Pcf to the target common rail pressure Pca.

The discharge quantity control device decides a basic drive signal to be applied to the metering control valve 5 based on the target common rail pressure Pca and the fuel temperature Tf and performs drive control of the supply pump 4. When the sensed actual common rail pressure Pcf and the target common rail pressure Pca do not coincide, the discharge quantity control device corrects the basic drive signal according to the difference between the actual common rail pressure Pcf and the target common rail pressure Pca and performs the drive control of the supply pump 4 with the corrected drive signal. The drive signal is a control value for controlling the pressure to the target common rail pressure Pca. The basic drive signal is a prospective value decided in accordance with the target common rail pressure Pca and corresponds to the target discharge quantity Qpa. The corrected drive signal is a control value for performing the feedback control for substantially conforming the pressure to the target common rail pressure Pca and corresponds to a necessary discharge quantity Qpf.

The pressure condition monitoring device has a fuel balance computation device that performs balance computation between an input quantity and an output quantity of the fuel to/from the common rail 2 (referred to as fuel input/output quantities, hereinafter) and a determination device that determines whether a control state is an abnormal control state due to an invalid sensing signal of the common rail pressure sensor 35 (shown by solid characteristic line in FIG. 4) based on the data applied to the balance computation of the fuel input/output quantities.

The fuel balance computation device has an input quantity calculation device for calculating the input quantity of the fuel to the common rail 2 and an output quantity calculation device for calculating the output quantity of the fuel from the common rail 2. Thus, the fuel balance computation device performs balance computation with the input quantity and the output quantity. The balance (difference) between the input quantity and the output quantity is monitored and the fuel leak is diagnosed (refer to FIG. 5(*b*)).

Figure 5:
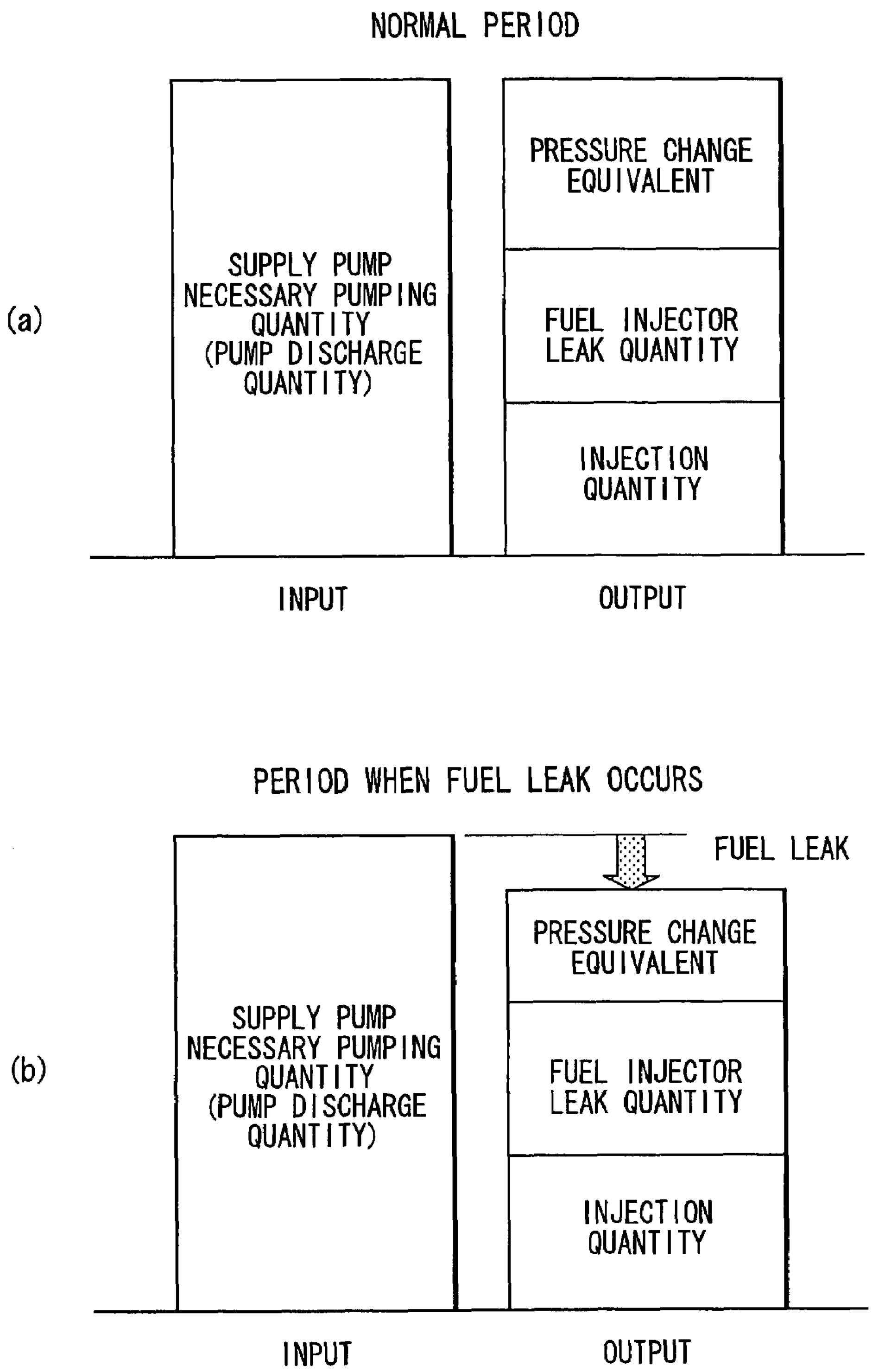
FIG. 5 is a diagram explaining a relationship of fuel balance in the case of a fuel leak abnormality and FIGS. 5(*a*) and 5(*b*) are graphs showing a fuel balance in a normal period and a fuel balance in a fuel leak abnormal period respectively.

The input quantity calculation device calculates the necessary discharge quantity Qpf of the supply pump 4, for example, as shown in FIG. 5(*a*), as the input quantity. The input quantity is not limited to the necessary discharge quantity Qpf but may be an index value corresponding to the necessary discharge quantity Qpf such as the corrected drive signal as long as the balance computation can be performed with the input quantity and the output quantity.

For example, as shown in FIG. 5(*a*), the output quantity calculation device calculates the injection quantity Qfin from the injector 3, the injector leak quantity QL and the pressure change quantity Qcc respectively, and calculates the sum of them as the output quantity. The injector leak quantity QL is a quantity of the fuel scheduled to leak from the high pressure section to the low pressure passage because of the structure of the injector 3. The pressure change quantity Qcc is the quantity of the fuel corresponding to the change of the fuel pressure in the common rail 2. The output quantity is not limited to the sum of the injection quantity Qfin, the injector leak quantity QL and the pressure change quantity Qcc but may be an index value corresponding to a total fuel quantity as long as the balance computation can be performed with the input quantity and the output quantity.

The determination device enables determination of whether there is an abnormal deviation equal to or greater than a predetermined value between the sensing value Pcob of the common rail pressure sensor 35 and the corresponding value Pcf assumed from the data applied to the balance computation of the fuel input/output quantities. The determination device determines whether there is the deviation abnormality equal to or greater than a predetermined quantity ΔQpf (refer to FIG. 3) based on the data (necessary discharge quantity Qpf in the present embodiment) applied to the balance computation of the fuel input/output quantities.

Here, the predetermined quantity ΔQpf and the corresponding value Pcf will be explained in reference to FIGS. 3 and 4. FIGS. 3 and 4 show an example in which wiring of the sensor harness does not follow a regular wiring method and is not performed normally (solid line in FIGS. 3 and 4). As shown in FIG. 4, when the output of the common rail pressure sensor 35 is an output value Vc, the ECU 10 will determine a sensing value Pcob1 shown on a right side ordinate axis as the sensing pressure Pcob based on the output value Vc and the characteristic map in the case of the normal output (characteristic shown by a dashed line in FIG. 4) regardless of whether the wiring is normal or abnormal.

The ECU 10 erroneously recognizes the actual fuel pressure Pcf to be the lower pressure Pcf1 because of the abnormal wiring. Accordingly, the common rail pressure is substantially conformed to the target common rail pressure Pca through the common rail control and the excessive quantity corresponding to the deviation ΔPcf (excessive pumping amount) is pumped. As a result, compared with the normal period, in the abnormal period, as shown in FIG. 3, an excessive pumping quantity ΔQpi corresponding to the excessive pumping amount ΔPcf arises in the necessary discharge quantity Qpf. Therefore, a corresponding value Pcf2 corresponding to the actual fuel pressure is calculated based on the necessary discharge quantity Qp2 as of the abnormality on the assumption that there is no fuel leak.

The abnormality determination method of the deviation ΔPcf between the target common rail pressure Pca (in detail, Pcf1 in example of FIG. 3) and the corresponding value Pcf2 determines the deviation ΔPcf by determining a predetermined quantity ΔQpf as a substitute. Thus, it can be determined whether the control is normal control or the abnormal control based on the sensing signal of the common rail pressure sensor 35 without making the structure complicated, e.g., by providing another pressure sensor in the common rail 2 for checking the common rail pressure sensor 35.

Next, operation of the fuel injection controller having the above-described structure will be explained with reference to FIG. 2. As shown in FIG. 2, at S101 (S means step), an abnormality flag (explained later) and the like are initialized when the engine is started (abnormality flag=0). At S102, it is determined whether the single body of the common rail pressure sensor 35 is in a malfunction state. If the single body of the common rail pressure sensor 35 is in the malfunction state, the processing shifts to S1 and stores "2" in the abnormality flag. If the single body of the common rail pressure sensor 35 is not in the malfunction state, the processing shifts to S103.

The control processing from S103 to S105 reads operation states by various sensors (S103) and carries out discharge quantity control of the supply pump 4 (S104) and injection quantity control of the injector 3 (S105) to supply the optimal injection quantity to the engine 1 at the optimal fuel injection pressure according to the operation state of the engine 1. At S106, the balance computation of the fuel input/output quantities to/from the common rail 2 is carried out. At S107, the necessary discharge quantity Qpf and the target discharge quantity Qpa as the data of the balance computation are read, and the deviation ΔQpi (ΔQpi=Qpf−Qpa) between the prospective value Qpa and the control value Qpf is calculated. Then, the processing proceeds to S108.

At S108, it is determined whether the deviation ΔQpi is greater than a predetermined value ΔQ. If the deviation ΔQpi is greater than the predetermined value ΔQ, it is determined that the abnormal control state based on the sensing value Pcob of the common rail pressure sensor (35) occurs and the processing shifts to S109 to calculate the pressure value Pcf (Pcf>Pcob) assumed from the necessary discharge quantity Qpf. If the deviation ΔQpi is equal to or less than the predetermined value ΔQ, it is determined that the normal control state based on the sensing value Pcob of the common rail pressure sensor (35) occurs and the processing returns to S103 to continue the monitoring.

If the corresponding value Pcf assumed from the necessary discharge quantity Qpf is calculated at S109, "1" is stored in the abnormality flag at S110 and the processing shifts to S112.

At S112, the data about the fuel injection controller and the engine as of the abnormality is stored as a history. As history information, the state of the abnormality flag, the corresponding value Pcf, the necessary discharge quantity Qpf when assuming the corresponding value Pcf, the deviation ΔQpi determined to be equal to or greater than predetermined value and the like are stored.

In the present embodiment described above, the determination device that determines whether there is the deviation (ΔPcf) between the sensing value Pcob1 of the common rail pressure sensor 35 and the corresponding value assumed from the data applied to the balance computation of the fuel input/output quantities and the storage part that stores the corresponding value Pcf2 based on the data (in detail, necessary discharge quantity Qpf) applied to the balance computation and the sensing value Pcob1 of the common rail pressure sensor 35 and that enables subsequent reading out of these values are provided.

Thus, even when the characteristic deviation arises in the sensing signal of the common rail pressure sensor 35 because of the incorrect wiring of the sensor harness or the like, it can be determined whether there is the abnormal deviation equal to or greater than the predetermined value (ΔPcf) between the sensing value Pcob1 of the common rail pressure sensor 35 and the corresponding value assumed from the data applied to the balance computation of the fuel input/output quantities.

Moreover, the corresponding value Pcf2 based on the necessary discharge quantity Qpf of the data applied to the balance computation and the sensing value Pcob1 of the common rail pressure sensor 35 deviated from the corresponding value are stored and can be read out afterward. Accordingly, it is possible to at least determine whether the cause of the abnormal deviation is the fuel leak from the high pressure fuel passage or the other factor.

Therefore, it can be determined whether the control is the normal control or the abnormal control based on the sensing signal of the common rail pressure sensor 35 even if the characteristic deviation of the common rail pressure sensor 35 arises due to incorrect wiring or the like.

When the fuel leak arises in the common rail fuel injection device having the accumulator 2, the fuel leak quantity is added to the data applied to the balance computation of the fuel input/output quantities even if the control is based on the normal sensing signal. Therefore, there is a possibility that the abnormal deviation is caused between the corresponding value assumed based on the data and the sensing value.

In the present embodiment described above, regarding the deviation between the sensing value Pcob1 of the common rail pressure sensor 35 and the corresponding value, it is determined whether the deviation ΔQpi from the target discharge quantity is the abnormal deviation equal to or greater than the predetermined quantity (ΔQ) based on the necessary discharge quantity Qpf applied to the balance computation. If the affirmative result is provided by the determination, the corresponding value Pcf and the necessary discharge quantity Qpf, from which the corresponding value is assumed, are stored in the storage part.

Thus, it can be determined whether the control is the normal control or the abnormal control based on the sensing signal of the common rail pressure sensor 35 without making the structure complicated, e.g., by proving another pressure sensor to the common rail 2 to check the common rail pressure sensor 35.

In the present embodiment described above, the method of determining whether the deviation between the sensing value Pcob1 of the common rail pressure sensor 35 and the corresponding value is the abnormal deviation uses the deviation amount ΔQpi between the target discharge quantity Qpa as the prospective value and the necessary discharge quantity Qpf as the control value for controlling the pressure to the target common rail pressure Pca as the deviation of the corresponding value based on the data applied to the balance computation.

Thus, the deviation amount ΔQpi between the prospective value Qpa and the control value Qpf is defined by using the discharge quantity Qp as the control value for controlling the fuel pressure in the common rail 2 to the target fuel pressure. Accordingly, it can be quickly determined whether the control is the normal control or the abnormal control based on the sensing signal of the common rail pressure sensor 35. Thus, the abnormal condition can be promptly announced to occupants of the vehicle having the engine 1 to urge the repair for retuning to the normal state.

In the present embodiment described above, the data of the deviation ΔQpi is stored in the storage part when the deviation between the control value Qpf and the prospective value Qpa is equal to or greater than the predetermined value (ΔQ).

Thus, in the case where a repair request for returning to the normal state is made at a repair shop or the like by a vehicle user such as the occupant, it can be easily determined whether the cause is the fuel leak or the characteristic deviation of the common rail pressure sensor 35 due to the incorrect wiring of the sensor harness and the like based on the deviation ΔQpi read from the storage part.

The invention claimed is:

1. A fuel injection controller used for a fuel injection device that pumps high-pressure fuel to an accumulator with a fuel supply pump and distributes the high-pressure fuel accumulated in the accumulator to injectors mounted to respective cylinders of an internal combustion engine, wherein the fuel injection controller calculates an input quantity and an output quantity of the fuel to and from the accumulator and monitors the fuel pressure in the accumulator with a pressure sensor attached to the accumulator, characterized by:

a determination device that determines whether there is a deviation (ΔPcf) between a sensing value (Pcob1) of the pressure sensor and a corresponding value assumed from data applied to balance computation of the fuel input/output quantities; and a storage part that stores the corresponding value (Pcf) based on the data (Qpf, Qp2) applied to the balance computation and the sensing value (Pcob1) of the pressure sensor and that enables subsequent reading out of the stored values.

2. The fuel injection controller as in claim 1, wherein the determination device determines whether the deviation between the sensing value (Pccb1) of the pressure sensor and the corresponding value assumed from the data is an abnormal deviation equal to or greater than a predetermined quantity (ΔQp) based on the data (Qpf, Qp2) applied to the balance computation, and the determination device stores the corresponding value (Pcf) and the data (Qp2), from which the corresponding value is assumed, in the storage part if an affirmative result is provided by the determination.

3. The fuel injection controller as in claim 1, further comprising:

a common rail pressure control device that controls the fuel pressure in the accumulator to target fuel pressure (Pca) based on the sensing value (Pcob1) of the pressure sensor, wherein the deviation of the corresponding value based on the data applied to the balance computation is a deviation amount (ΔQpi) between a prospective value (Qpa, Qp1) based on balance computation values of the fuel input/output quantities and a control value (Qpf, Qp2) for controlling the pressure to the target fuel pressure (Pca) based on the balance computation values of the fuel input/output quantities.

4. The fuel injection controller as in claim 3, wherein the storage part stores the data of the deviation amount (ΔQpi) when the deviation between the control value (Qpf, Qp2) and the prospective value (Qpa, Qp1) is equal to or greater than a predetermined value (ΔQp).

5. The fuel injection controller as in claim 4, wherein the balance computation values include a discharge quantity index value (Qp) representing a fuel pumping quantity pumped by the fuel supply pump to the accumulator as the input quantity.

* * * * *